United States Patent
Aharony et al.

(10) Patent No.: US 9,628,219 B2
(45) Date of Patent: Apr. 18, 2017

(54) APPARATUS AND METHOD FOR TRANSMITTING AND RECEIVING POLARIZED SIGNALS

(71) Applicants: Ahikam Aharony, Ottawa (CA);
Mahdi Zamani, Ottawa (CA)

(72) Inventors: Ahikam Aharony, Ottawa (CA);
Mahdi Zamani, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/814,981

(22) Filed: Jul. 31, 2015

(65) Prior Publication Data

US 2017/0033890 A1  Feb. 2, 2017

(51) Int. Cl.
*H04B 7/10* (2006.01)
*H04L 1/00* (2006.01)
*H04B 7/04* (2017.01)

(52) U.S. Cl.
CPC ............ *H04L 1/0033* (2013.01); *H04B 7/10* (2013.01); *H04B 7/0469* (2013.01)

(58) Field of Classification Search
CPC ...... H04B 7/10; H04B 10/532; H04B 7/0469; H04L 1/0033
See application file for complete search history.

(56) References Cited

U.S. PATENT DOCUMENTS

| | | | | |
|---|---|---|---|---|
| 4,090,137 A * | 5/1978 | Soma | ..................... | H04B 7/002 342/364 |
| 4,723,321 A * | 2/1988 | Saleh | ..................... | H04B 7/10 342/361 |
| 6,697,641 B1 * | 2/2004 | Shapira | ..................... | H01Q 1/246 342/361 |
| 8,994,588 B2 * | 3/2015 | Petersson | ..................... | 342/361 |
| 9,270,359 B2 * | 2/2016 | Asplund | ..................... | H04B 7/0413 |
| 2007/0041464 A1 * | 2/2007 | Kim | ..................... | H04L 1/0026 375/267 |
| 2008/0108314 A1 | 5/2008 | Mihota | | |
| 2008/0198941 A1 * | 8/2008 | Song | ..................... | H04L 1/0047 375/260 |
| 2009/0143042 A1 * | 6/2009 | Kawai | ..................... | H04B 1/126 455/296 |
| 2010/0060670 A1 | 3/2010 | Kuo | | |

(Continued)

OTHER PUBLICATIONS

Claes Beckman and Ulrik Wahlberg, Antenna Systems for Polarization Diversity, Microwave Journal (May 1, 1997).

*Primary Examiner* — Sophia Vlahos

(57) ABSTRACT

Provided is an apparatus and method for transmitting and receiving polarized signals. Wireless communication with multiple polarized signals may experience greater attenuation on one polarized signal than another polarized signal. The polarized signal that is more attenuated limits overall throughput for the wireless communication. According to an embodiment of the invention, signals undergo rotation processing with a transformation involving a rotation matrix prior to transmission. Each polarized signal that is transmitted is based on a different weighted combination of the signals. The rotation processing can be performed with an objective that signals recovered at a receiver have comparable signal quality, which can increase overall throughput. In some implementations, the rotation processing is performed based on feedback to dynamically adjust the rotation processing.

26 Claims, 10 Drawing Sheets

(56) References Cited

U.S. PATENT DOCUMENTS

| | | | |
|---|---|---|---|
| 2011/0080970 A1* | 4/2011 | De Pasquale | H04B 7/0413 375/267 |
| 2011/0142104 A1* | 6/2011 | Coldrey | H04B 7/10 375/211 |
| 2012/0007789 A1* | 1/2012 | Petersson | H01Q 21/24 343/876 |
| 2012/0140801 A1* | 6/2012 | Asplund | H04B 7/0417 375/219 |
| 2012/0212372 A1* | 8/2012 | Petersson | H01Q 3/26 342/373 |
| 2012/0320994 A1* | 12/2012 | Loghin | H03M 13/11 375/240.27 |
| 2013/0182794 A1* | 7/2013 | Ringstrom | H04B 7/0434 375/297 |
| 2013/0272448 A1 | 10/2013 | Moon et al. | |
| 2013/0303080 A1* | 11/2013 | Moreno | H04J 11/004 455/9 |
| 2016/0065277 A1* | 3/2016 | Moss | H04B 7/0413 375/267 |

* cited by examiner

US 9,628,219 B2

APPARATUS AND METHOD FOR TRANSMITTING AND RECEIVING POLARIZED SIGNALS

FIELD OF THE INVENTION

This application relates to wireless communication, and more particularly to transmitting and receiving polarized signals.

BACKGROUND

Environmental factors such as rain or other forms of precipitation can attenuate wireless communication including microwave communication. Rain drops can be less than 2 mm or even greater than 5 mm. Larger rain drops tend to attenuate wireless communication more than smaller rain drops. The size of rain drops is approximately in the same scale as λ/4 of microwave signals.

Wireless communication over multiple polarizations may experience greater attenuation on one polarized signal than on another polarized signal, especially during rain. Rain drops are often pancake shaped and not spherical, such that they have a horizontal cross-sectional area that is greater than a vertical cross-sectional area. The bigger the size of rain drops in a dimension perpendicular to the polarization, the more attenuation will be experienced. Thus, a horizontally-polarized signal may be attenuated by rain more than a vertically-polarized signal due to the rain drops being pancake shaped.

SUMMARY OF THE INVENTION

According to an embodiment of the invention, a transmitting apparatus performs rotation processing for first and second signals prior to transmission. The rotation processing is performed using a rotation matrix such that each of first and second processed signals is a respective different weighted combination of the first and second signals. The transmitting apparatus wirelessly transmits the first processed signal with a first polarization, and wirelessly transmits the second processed signal with a second polarization that is substantially orthogonal to the first polarization.

According to another embodiment of the invention, a receiving apparatus performs rotation processing after wirelessly receiving a first signal with a first polarization and wirelessly receiving a second signal with a second polarization that is substantially orthogonal to the first polarization. The rotation processing of the receiving apparatus is performed in a manner that is complementary to the rotation processing of the transmitting apparatus.

In some implementations, the rotation processing by the transmitting apparatus is performed based on feedback from the receiving apparatus. The feedback may allow the transmitting apparatus to dynamically adjust the rotation processing with an objective of achieving comparable signal quality for signals that are recovered by the receiving apparatus. This may allow a higher modulation level to be used thereby increasing spectral efficiency than if the rotation processing was not performed.

Other aspects and features of the present invention will become apparent, to those ordinarily skilled in the art, upon review of the following description of the various embodiments of the invention.

BRIEF DESCRIPTION OF THE DRAWINGS

Embodiments will now be described by way of example with reference to the attached drawings in which.

DETAILED DESCRIPTION OF EMBODIMENTS

It should be understood at the outset that although illustrative implementations of one or more embodiments of the present invention are provided below, the disclosed systems and/or methods may be implemented using any number of techniques. The invention should in no way be limited to the illustrative implementations, drawings, and techniques illustrated below, including the exemplary designs and implementations illustrated and described herein, but may be modified within the scope of the appended claims along with their full scope of equivalents.

Apparatus for Transmitting and Receiving Polarized Signals

Figure 1:
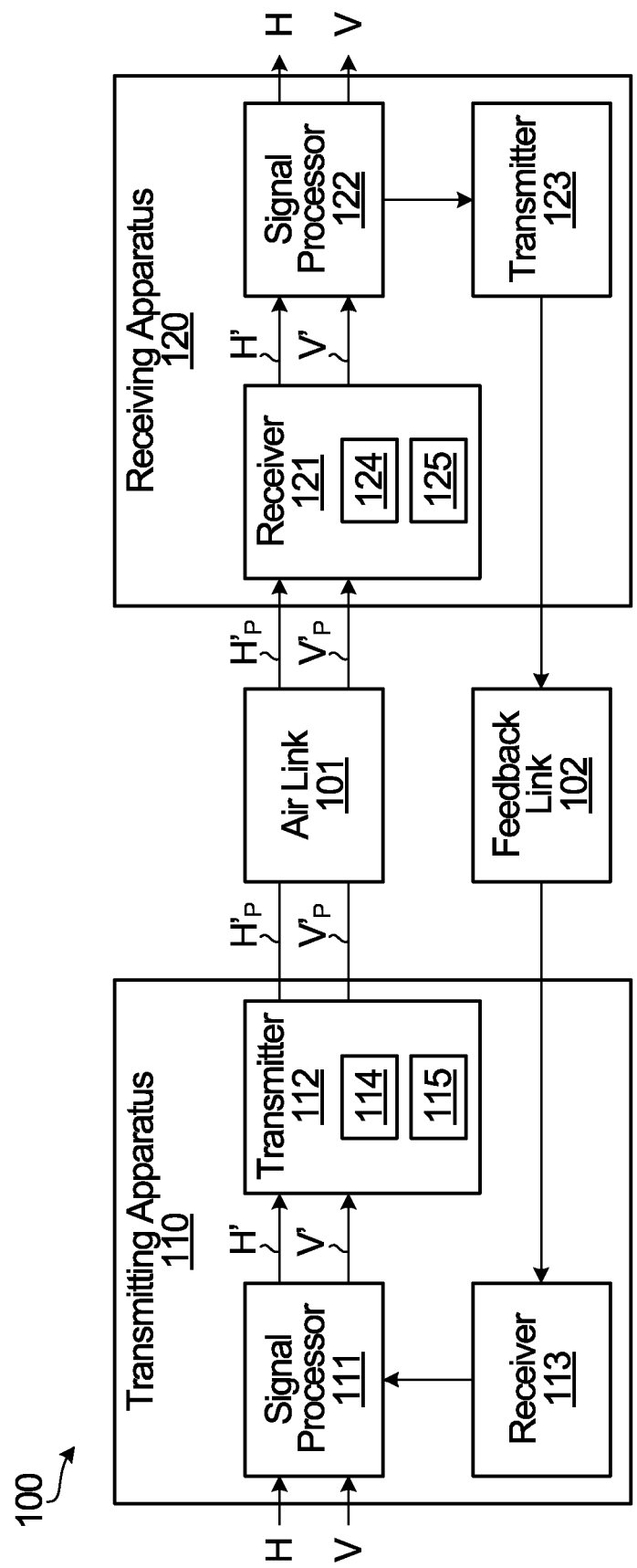
FIG. 1 is a block diagram of a wireless system featuring a transmitting apparatus and a receiving apparatus, in accordance with an embodiment of the invention.

Referring now to FIG. 1, shown is a schematic of a wireless system 100 featuring a transmitting apparatus 110 and a receiving apparatus 120, in accordance with an embodiment of the invention. The transmitting apparatus 110 has a signal processor 111, a transmitter 112, a receiver 113, and may have other components that are not specifically shown. The signal processor 111, the transmitter 112, and the receiver 113 may be co-located, or installed in different locations. The receiving apparatus 120 has a receiver 121, a signal processor 122, a transmitter 123, and may have other components that are not specifically shown. The receiver 121, the signal processor 122, and the transmitter 123 may be co-located, or installed in different locations.

Operation of the wireless system 100 will now be described. Inputs to the transmitting apparatus 110 include first and second signals H, V, which include data to be transmitted over an air link 101 to the receiving apparatus 120. The first and second signals H, V may for example be independent data streams provided by a processor (not shown). Alternatively, the first and second signals H, V may be identical data streams for redundancy. The way that the first and second signals H, V are transmitted may depend on conditions of the air link 101.

During ideal conditions of the air link 101, the transmitting apparatus 110 may wirelessly transmit the first signal H with a horizontal polarization, and likewise wirelessly transmit the second signal V with a vertical polarization, hence the signals being denoted with "H" for horizontal and "V" for vertical". The wireless transmission involves at least one antenna, which provides each signal with a polarization based on antenna orientation. The result is polarized signals, which travel over the air link 101 and are received by the receiving apparatus 120 as polarized signals. The receiving apparatus 120 then processes the polarized signals to recover the signals H, V. The polarized signals received by the receiving apparatus 120 are not identical to the polarized signals transmitted by the transmitting apparatus 110 due to attenuation over the air link 101.

However, when the air link 101 is not ideal, for example during rain or other precipitation, then the signal processor 111 of the transmitting apparatus 110 is configured to perform rotation processing on the first and second signals H, V prior to transmission. In particular, the signal processor 111 applies a rotation matrix. In specific implementations, the signal processor 111 applies $$\begin{bmatrix} H' \\ V' \end{bmatrix} = \begin{bmatrix} \cos\theta & -\sin\theta \\ \sin\theta & \cos\theta \end{bmatrix} \begin{bmatrix} H \\ V \end{bmatrix}, \quad [1]$$

where H', V' are first and second processed signals, and θ is an angle of rotation for the rotation matrix. The transmitter 112 of the transmitting apparatus 110 then wirelessly transmits the first processed signal H' with a horizontal polarization, and wirelessly transmits the second processed signal V' with a vertical polarization. Again, each signal is provided with a polarization based on antenna orientation. The result is polarized signals H'$_P$, V'$_P$, which travel over the air link 101 and are received by the receiving apparatus 120 as polarized signals H'$_P$, V'$_P$.

Upon reception of the polarized signals H'$_P$, V'$_P$, the receiver 121 of the receiving apparatus 120 produces a first signal H' and a second signal V'. The signal processor 122 of the receiving apparatus 120 then processes the first and second signals H', V' to recover the signals H, V by applying rotation processing that is opposite to that performed by the transmitting apparatus 110. In particular, the first and second signals H, V may be recovered according to $$\begin{bmatrix} H \\ V \end{bmatrix} = \begin{bmatrix} \cos\theta & \sin\theta \\ -\sin\theta & \cos\theta \end{bmatrix} \begin{bmatrix} H' \\ V' \end{bmatrix}, \quad [2]$$

where θ is the same angle of rotation used in equation [1].

According to the rotation processing of equation [1], the first processed signal H' is a weighted combination of the first and second signals H, V, while the second processed signal V' is a different weighted combination of the first and second signals H, V. Although the rotation processing does not avoid attenuation of the polarized signals H'$_P$, V'$_P$ over the air link 101, the rotation processing may reduce the harmful effects resulting from inequalities of the attenuation as seen by horizontal and vertical polarized signals. For example, any decrease of signal quality due to a relatively high attenuation of the horizontally-polarized signal due to rain or other precipitation may be shared by the two signals H, V that are recovered by the signal processor 122 of the receiving apparatus 120 based on the weighted combinations. If the sharing is equal, then the two recovered signals H, V may have comparable signal quality, which may permit the same modulation level to be used for the first and second signals H, V. This may improve spectral efficiency, particularly when one of the signals transmitted without rotation processing would only have supported a lower modulation level due to the greater attenuation. In essence, the harmful effects of polarization-dependent attenuation may be averaged out over the two recovered signals H, V at the receiving apparatus 120, which may lead to an improvement in performance compared to a situation in which there is no rotation processing and the harmful effects are focused on one of the signals.

Incidentally, the rotation processing may enable similar performance of wireless communication during precipitation as would be provided by mechanically rotating the antennas without the rotation processing described herein. In particular, if the antennas were instead mechanically rotated such that attenuation is shared by the polarized signals, then the signals recovered by a receiver may have comparable signal quality, which may permit the same modulation level and improve spectral efficiency as previously described. However, in practice, it is difficult to mechanically rotate antennas, especially in response to conditions such as rain. Also, mechanically rotating antennas may not be permissible in some jurisdictions in which a spectrum regulator may require fixed horizontal and vertical polarizations. Embodiments of the invention avoid any need to mechanically rotate antennas by instead performing rotation processing.

Figure 2:
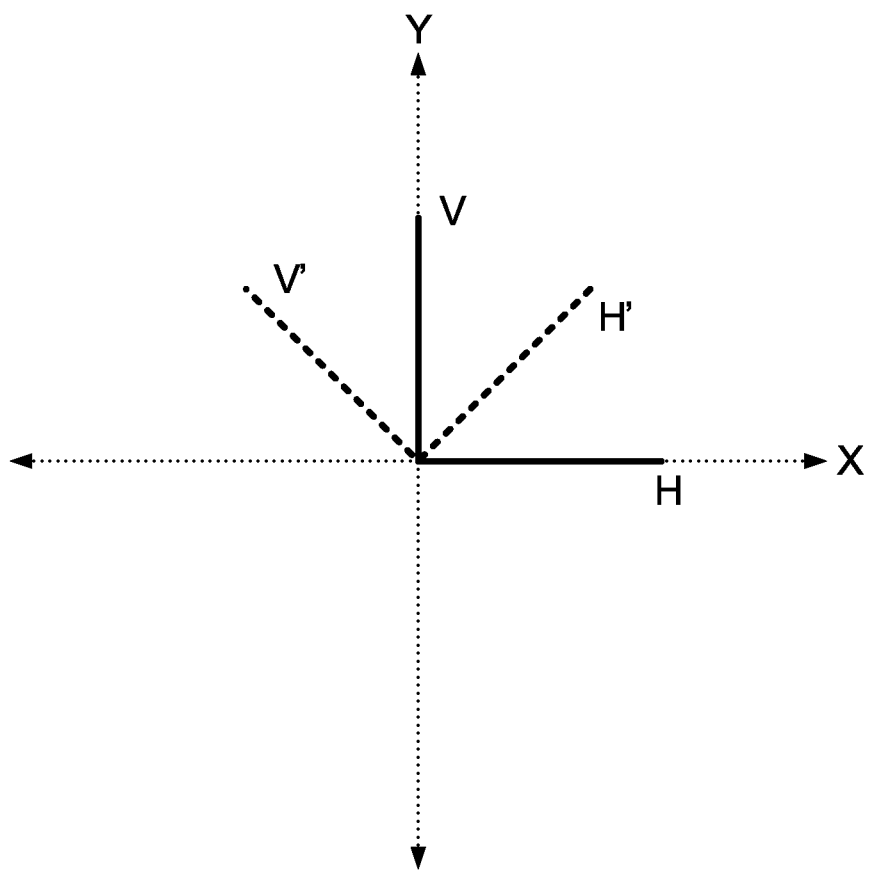
FIG. 2 is a graph showing the transmission of rotated signals, and the transmission of signals from physically rotated antennas.

To illustrate the effect of the rotation processing, reference is made to FIG. 2 in which the x-axis represents horizontal polarization and the y-axis represents vertical polarization. The first processed signal H' is to be transmitted as the horizontally-polarized signal H'$_P$. The second processed signal V is to be transmitted as the vertically-polarized signal V'$_P$. Because of rotation processing, the first processed signal H' is not simply the first signal H, but rather is a weighted combination of the first and second signals H, V (i.e. cos θ·H−sin θ·V according to equation [1]). Likewise, the second processed signal V' is not simply the second signal V$_T$, but rather is a weighted combination of the first and second signals H, V (i.e. sin θ·H+cos θ·V according to equation [1]).

The first and second processed signals H', V' are shown as if they were transmitted with polarizations offset by the angle of rotation from the x-axis and the y-axis respectively, for example as might be achieved with physically rotated antennas. This is for the sake of illustration; it should be clearly understood that there is no physical rotation of antennas for transmission of the first and second processed signals H', V' with polarizations offset by the angle of rotation from the x-axis and the y-axis respectively. However, because of the rotation processing performed in generating the processed signals H', V' from the first and second signals H, V, the effect of interference on the first and second signals H, V, from rain for example, is the same in both instances. In this sense, the transmission of the processed signals H', V' using horizontally and vertically polarized antennas is equivalent to the transmission of the first and second signals H, V using physically rotated antennas, specifically in terms of the effect of interference on the first and second signals H, V.

If interference on the air link 101 is from a constant amount of rain with a constant rain drop size falling at a uniform direction φ, then the angle of rotation θ that would best balance signal quality for the recovered signals H, V at the receiving apparatus 120 would be $$\theta = \frac{\pi}{4} - \phi. \qquad [3]$$

This relationship sets the angle of rotation at π/4 (i.e. 45°) from the rain. Thus, if the direction of rain is vertical (i.e. φ=0°) in a theoretical situation of constant rain amount, rain drop size and vertical direction, then the angle of rotation θ is π/4 (i.e. 45°). However, it is noted that the transmitting apparatus 110 and the receiving apparatus 120 do not need to know or measure the actual direction of rain. In fact, in reality, the rain would likely not be falling in a uniform direction over the entire channel. Rather, through feedback with the objective of balancing signal quality of the first and second signals H, V at the receiving apparatus 120 as described above, the wireless system 100 can determine a value for the angle of rotation θ that balances signal quality of the first and second signals H, V. Embodiments of the invention are general for any rain direction and any polarization-dependent attenuation.

In some embodiments, in addition to a rotation, the rotation matrix includes additional processing such as a gain for example. Thus, the signal processor 111 of the transmitting apparatus may implement many different types of processing. In some implementations, the signal processor 111 applies the rotation and the additional processing concurrently in a single operation. For example, the signal processor 111 could apply a rotation matrix of $$\begin{bmatrix} 1 & 1 \\ -1 & 1 \end{bmatrix},$$

which effectively applies both a rotation of 45° and a gain of √2 in one operation. In this regard, it is noted that the rotation matrix that is implemented does not need to be identical to the rotation matrix shown in equation [1] or the rotation matrix shown in equation [2]. In other implementations, the signal processor 111 applies additional processing as a separate operation from the rotation matrix. For example, the signal processor 111 can apply a rotation, and also apply a gain before and/or after the rotation is applied.

In some implementations, the transmitter 112 of the transmitting apparatus 110 includes a first polarization transmitter 114 for transmitting the horizontally-polarized signal $H'_P$, and a second polarization transmitter 115 for transmitting the vertically-polarized signal $V'_P$. The two polarization transmitters 114,115 are synchronized to the same symbol clock and, in some embodiments, transmit using a single reflector antenna that has two feeds: one feed for transmitting the horizontally-polarized signal $H'_P$ and another feed for transmitting the vertically-polarized signal $V'_P$. In another embodiment, the two polarization transmitters 114, 115 use two separate antennas that are oriented such that their polarizations are orthogonal to one another. In some implementations, the receiver 121 of the receiving apparatus 120 likewise includes a first polarization receiver 124 for receiving the horizontally-polarized signal $H'_P$, and a second polarization receiver 125 for receiving the vertically-polarized signal $V'_P$. The two polarization receivers 124,125 are synchronized to the same symbol clock and, in some embodiments, receive using a single reflector antenna that has two outputs: one output for receiving the horizontally-polarized signal $H'_P$ and another output for receiving the vertically-polarized signal $V'_P$. In another embodiment, the two polarization receivers 124,125 use two separate antennas that are oriented such that their polarizations are orthogonal to one another. According to the foregoing implementations, the wireless system 100 is a multiple-input and multiple-output (MIMO) system.

In the illustrated example, the wireless system 100 utilises horizontally-polarized and vertically-polarized signals. However, it is to be understood that other polarizations are possible and are within the scope of the invention. Any two static polarizations that are perpendicular to one another could be used. For example, other antennas could be configured to produce 45° and 135° polarizations. Such polarizations would neither be horizontal nor vertical in direction.

In some implementations, as shown in FIG. 1, the wireless system 100 implements feedback over a feedback link 102. The feedback link 102 might for example be an existing channel of an air link from the receiving apparatus 120 to the transmitting apparatus 110. Alternatively, the feedback link 102 may be a wired link. In some feedback implementations, the signal processor 122 of the receiving apparatus 120 is configured to determine a first signal quality of the first processed signal H and a second signal quality of the second processed signal V at the receiving apparatus 120. The transmitter 123 of the receiving apparatus 120 is configured to send feedback based on the first and second signal quality. The feedback is received by the receiver 113 of the transmitting apparatus 110. The signal processor 111 is configured to, based on the feedback, adjust weightings used to generate the first and second processed signals H', V' in accordance with the rotation matrix. There are many possibilities for the feedback. Examples are provided below.

In some implementations, the feedback is an indication of the signal quality for signals recovered at a receiver from the first and second polarized signals. Such indication might for example include Signal to Noise Ratio (SNR) for each signal H, V recovered by the signal processor 122 of the receiving apparatus 120. Alternatively, or additionally, such indication might include Error Vector Magnitude (EVM) for each signal H, V recovered by the signal processor 122 of the receiving apparatus 120. Other indications of signal quality are possible and are within the scope of the invention. In general, any appropriate indication of signal quality from which the signal processor 111 of the transmitting apparatus 110 can adjust the weightings can be used.

In some implementations, the purpose of the feedback is to allow the transmitting apparatus 110 to adjust the weightings provided by the rotation matrix with the objective of causing the recovered signals H, V at the receiving apparatus 120 to have comparable signal quality. For example, feedback can be used by the signal processor 111 of the transmitting apparatus 110 to increase or decrease an angle of rotation of the rotation matrix with the objective of achieving the comparable signal quality for the recovered signals H, V. If the recovered signals H, V have comparable signal quality, then the same modulation level can be used for the first and second signals H, V. As noted above, this may improve spectral efficiency and overall performance.

In some implementations, the feedback is sent only when the recovered signals H, V at the receiving apparatus 120 do not have comparable signal quality. This avoids sending feedback when the feedback is not necessary. In such an embodiment, if no changes to the rotation processing are needed, the transmission of feedback is avoided.

In some implementations, the feedback is an indication of an updated value to use for the angle of rotation. Thus, rather than leaving it up to the signal processor 111 of the transmitting apparatus 110 to determine what angle of rotation to use for a given indication of signal quality, the signal processor 122 of the receiving apparatus 120 uses the feedback to send an explicit indication of the angle of rotation to use. The signal processor 111 of the transmitting apparatus 110 can then adjust the weightings to be used in accordance with the angle of rotation.

In some implementations, the feedback is an indication to increment the angle of rotation or an indication to de-increment the angle of rotation. Thus, rather than specifically identifying the angle of rotation to be used, the signal processor 122 of the receiving apparatus 120 controls changes to the angle of rotation via the feedback. The signal processor 111 of the transmitting apparatus 110 can adjust the angle of rotation accordingly, thereby adjusting the weightings to be used by the rotation processing.

In some implementations, in the event that the feedback does not contain an explicit indication of the angle of rotation and the transmitting apparatus 110 determines the angle of rotation to be used based on the feedback, then the receiving apparatus 120 also calculates the angle of rotation in the same way that the transmitting apparatus 110 does. Thus, both the transmitting apparatus 110 and the receiving apparatus 120 keep track of the angle of rotation and operate using the same angle of rotation. In alternative implementations, there may be additional signalling for the transmitting apparatus 110 to convey the angle of rotation to the receiving apparatus 120.

In alternative implementations, there is no feedback provided by the receiving apparatus 120 for the transmitting apparatus 110. For example, the transmitting apparatus 110 could determine suitable weightings used to generate the first and second processed signals H', V' based on whether there is precipitation. An arbitrary angle of rotation (e.g. 45°) could be selected when there is precipitation. The angle of rotation could for example be fixed at 45°, which may be suitable for vertical rain as explained above. It should be understood that the angle of rotation could be increased by an integer multiple of 90° (e.g. 135°, −45° or −135° instead of 45°), to produce an equivalent result. Note that keeping the angle of rotation fixed in this manner is different from a mechanical fixed slant 45° installation, which is often not possible mechanically or not permitted in some jurisdictions by a spectrum regulator.

In some implementations, the transmitting apparatus 110 and the receiving apparatus 120 have similar or even identical configurations. In particular, the receiving apparatus 120 may also have components for processing and transmitting data, and the transmitting apparatus 110 may also have components for receiving and processing data. Thus, the receiving apparatus 120 may be capable of transmitting data, and the transmitting apparatus 110 may be capable to receiving the data. In other words, data communication may be supported in both directions.

In some implementations, the wireless system 100 uses CCDP (Co-Channel Dual-Polar) communication. In specific implementations, the wireless system 100 uses microwave communication between the transmitting apparatus 110 and the receiving apparatus 120. The wireless system 100 might for example be part of a backhaul network. In specific implementations, the wireless system 100 uses XPIC (Cross-Polarization Interference Cancellation). In specific implementations, the transmitting apparatus 110 and the receiving apparatus 120 include backhaul microwave XPIC modems. However, other forms of wireless communication are possible and are with the scope of the invention.

There are many possibilities for the signal processor 111 of the transmitting apparatus 110 and the signal processor 122 of the receiving apparatus 120. In some implementations, the signal processors 111, 122 are Digital Signal Processors (DSPs). In alternative implementations, the signal processors 111, 122 are analog signal processors. More generally, the signal processors 111, 122 can be any appropriately configured processors for processing signals as described herein. While shown as a single element, each of the signal processors 111, 122 may be implemented as a combination of multiple components. Example signal processor implementations are described below with reference to FIGS. 3-6.

Example Signal Processor Implementations

Figure 3:
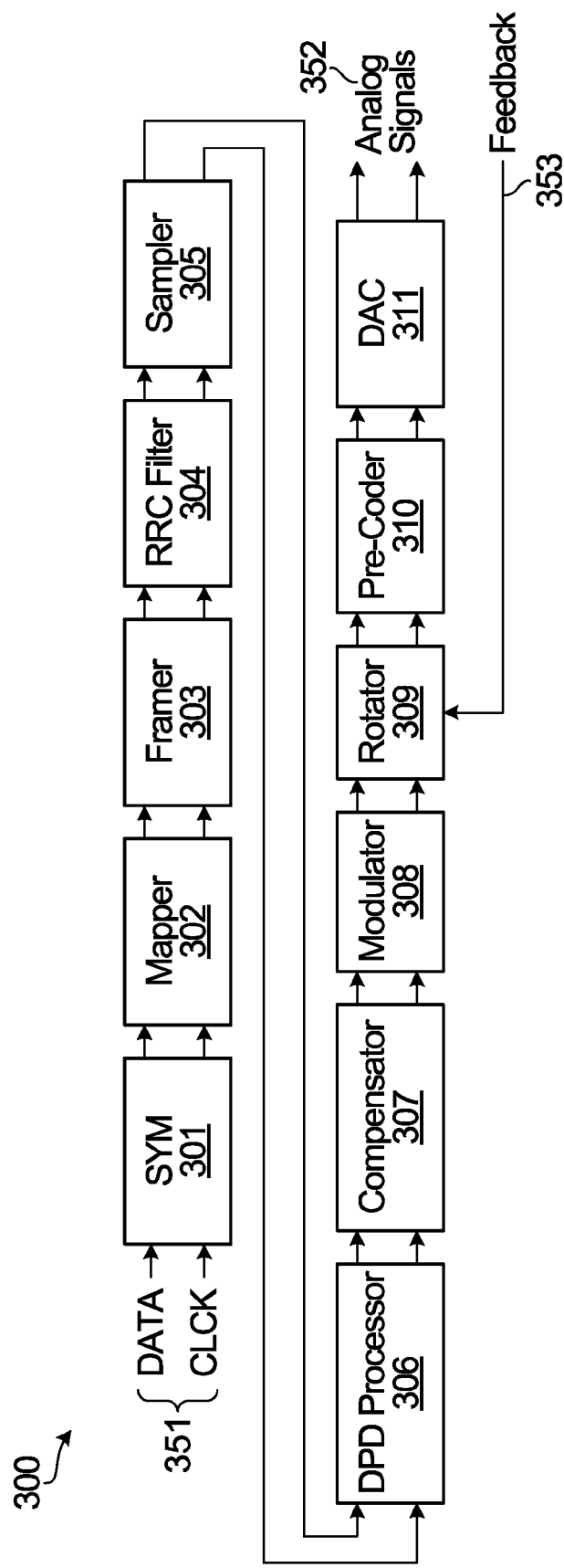
FIG. 3 is a block diagram of an example signal processor of a transmitting apparatus, in accordance with an embodiment of the invention.

Referring now to FIG. 3, shown is block diagram of an example signal processor 300 of a transmitting apparatus, in accordance with an embodiment of the invention. The signal processor 300 might, for example, be implemented in a DSP. It is to be understood that the signal processor 300 is shown with very specific components in a very specific arrangement for illustrative purposes only. Other configurations are possible and are within the scope of the invention.

The signal processor 300 has inputs 351 including a clock signal and data to be transmitted. The data is split into two streams and, for each stream, the data may be formed as data symbols as shown by block 301. In some implementations, block 301 also performs Forward Error Correction (FEC) encoding for each stream. Subsequent blocks are connected with pairs of arrows representing two streams. For each stream, the data symbols are mapped into Quadrature Amplitude Modulation (QAM) symbols by a mapper 302. The QAM symbols have In-Phase/Quadrature (IQ) components and may use any appropriate constellation including a Quadrature Phase-Shift Keying (QPSK) constellation for example. For each stream, the QAM symbols are then assembled in a data frame by a framer 303. For each stream, the data frame is processed by a Root Raised Cosine (RRC) filter 304 for pulse shaping and possible reduction of Inter-Symbol Interference (ISI) between adjacent QAM symbols. However, different pulse shaping filters can be used. For each stream, the processed data frame is then passed through a sampler 305 for interpolation sampling and then through a Digital Pre-Distortion (DPD) processor 306 for digital pre-distortion processing. This processing may compensate for any non-linear distortion created by power amplification. Next, for each stream, a compensator 307 performs IQ compensation, which may allow for adjustment of any imbalance between IQ channels. Next, for each stream, a modulator 308 performs modulation to generate a modulated signal.

Rather than transmitting the modulated signals, in accordance with an embodiment of the invention, the signal processor 300 performs rotation processing using a rotator 309. The rotation processing might for example involve performing rotation in the digital domain in accordance with equation [1]. The rotation processing may improve performance by allowing a higher modulation level by the modulator 308 because signal quality of signals recovered at a receiving apparatus may be increased by the rotation processing as described earlier. In some implementations, as in the illustrated example, the rotator 309 performs the rotation processing based on feedback 353 from the receiving apparatus. The rotation processing might for example involve increasing or decreasing an angle of rotation according to the feedback with the objective of achieving comparable signal quality for the signals recovered at the receiving apparatus. Next, for each processed signal from the rotator 309, a pre-coder 310 performs pre-coding prior to a Digital to Analog Converter (DAC) 311 converting the pre-coded signal to an analog signal 352 for transmission by a transmitter (not shown). The pre-coder 310 pre-compensates for linear distortions that may occur by the DAC 311. Note that this pre-compensation could alternatively be performed before the rotation processing by the rotator 309.

Figure 4:
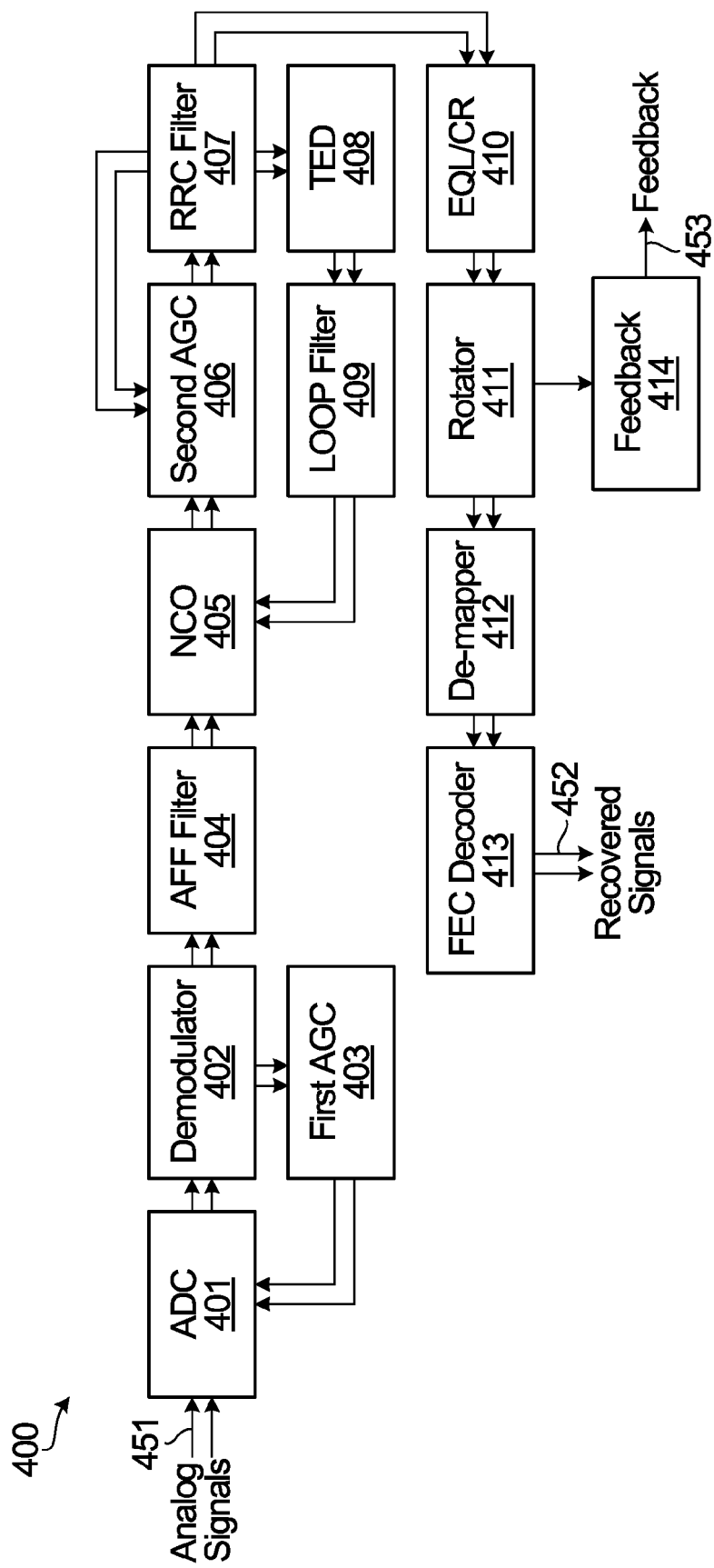
FIG. 4 is a schematic of an example signal processor of a receiving apparatus, in accordance with an embodiment of the invention.

Referring now to FIG. 4, shown is a block diagram of a signal processor 400 of a receiving apparatus, in accordance with an embodiment of the invention. The signal processor 400 might, for example, be implemented in a DSP. It is to be understood that the signal processor 400 is shown with very specific components in a very specific arrangement for illustrative purposes only. Other configurations are possible and are within the scope of the invention.

The signal processor 400 receives two analog signals 451 from a receiver (not shown). Each analog signal is converted to a digital signal by an Analog to Digital Converter (ADC) 401. Each digital signal is processed by a demodulator 402 in order to decouple IQ components of the digital signal. Each digital signal uses QAM symbols, which have IQ components. Based on each decoupling, there is feedback through a first Adaptive Gain Controller (AGC) 403 to adjust power levels of the conversion by the ADC 401. For each stream, the decoupled IQ components are processed by an Adaptive Feed Forward (AFF) filter 404. The AFF filter 404 performs equalization.

Next, for each output of the AFF filter 404, a Numerically Controlled Oscillator (NCO) 405 creates a synchronous signal from the output of the AFF filter 404. The timing of the signal is controlled with feedback Phase-Locked Loop (PLL). Each synchronous signal is provided to a second AGC 406 for adjusting gain of the synchronous signal, and then to an RRC filter 407 for pulse shaping of the synchronous signal. The RRC filter 407 provides feedback to the second AGC 406 in order to adjust gain of the second AGC 406. A Timing Error Detector (TED) 408 and a loop filter 409 provide feedback for the NCO 405 so that the timing of each synchronous signal generated by the NCO 405 is proper. The TED 408 might for example implement a Gardner method or any other appropriate method for detecting error in timing. Equalization and carrier recovery (EQL/CR) is performed on each output of the RRC filter 407 at block 410.

In accordance with another embodiment of the invention, a rotator 411 performs rotation processing on the outputs of block 410. The rotation processing of the rotator 411 is complementary to the rotation processing of the rotator 309 of FIG. 3. The rotation processing of the rotator 411 might for example involve performing rotation in the digital domain in accordance with equation [2]. In some implementations, the signal processor 400 has a feedback block 414 that produces feedback 453 for a transmitting apparatus (not shown) to adjust rotation processing. Such feedback may be based on signal quality of the signals recovered after the rotation.

After the rotation processing, the recovered signals are demapped by a de-mapper 412 and subjected to FEC decoding by an FEC decoder 413 to produce recovered signals 452. In alternative implementations, if no FEC encoding was performed by the transmitting apparatus, then there is no FEC decoding performed by the signal processor 400.

In the foregoing examples with reference to FIGS. 3 and 4, all processing is applied on both streams. Most of the processing can be done independently in two separate branches. For example, carrier recovery at block 410 can be done independently in two separate branches. However, some processing is jointly performed. In particular, the rotation processing by the rotator 309 and the rotator 411 is jointly performed. This is because the rotation processing involves mixing the streams, for example using equations [1] and [2] as noted above.

During transmission, the air link introduces noise in the horizontal and vertical polarization channels. While signal components are subject to rotation processing at the transmitter and then de-rotation processing at the receiver, the noise is only subject to de-rotation processing, as the noise is introduced after the rotation processing by the transmitter. The result is that, after de-rotation, there is a correlation between the noise on the two channels, and this can be disadvantageous. An example signal processor for mitigating the effect of the correlation between the noise on the two channels will be described below with reference to FIG. 5.

Figure 5:
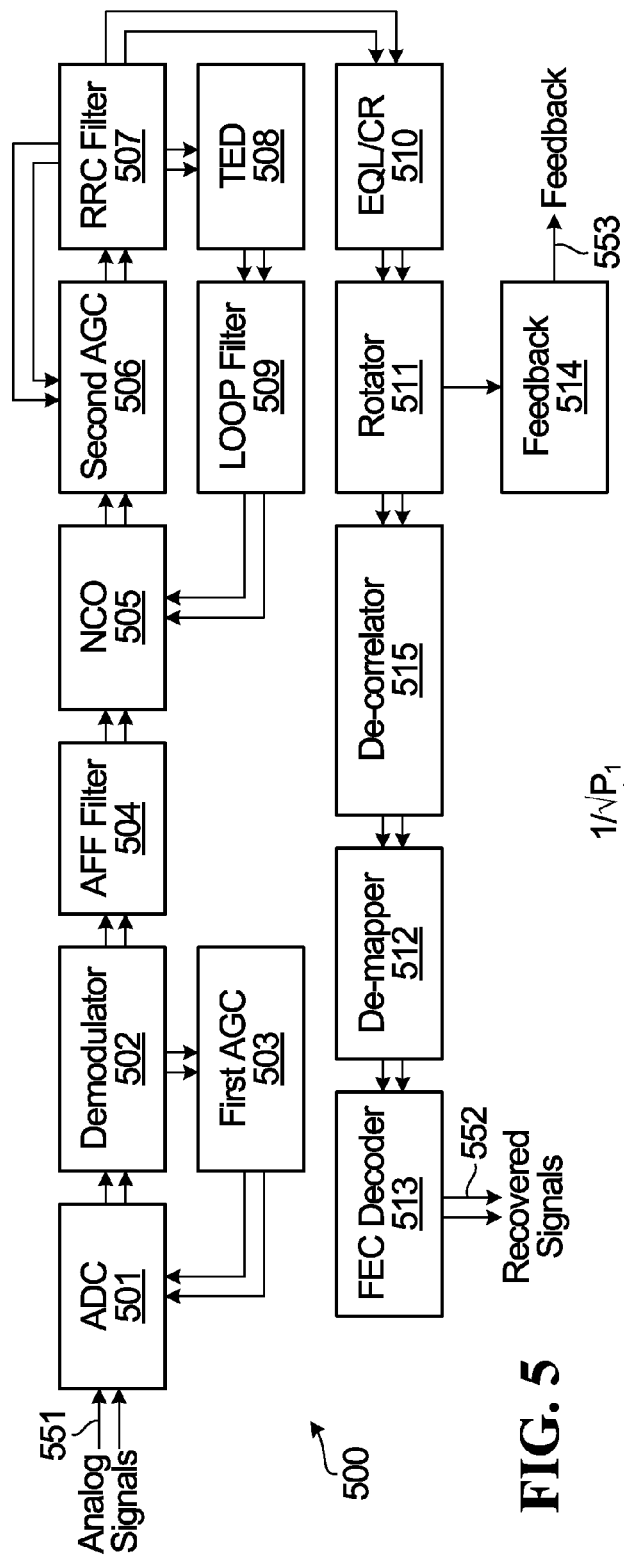
FIG. 5 is a schematic of an example signal processor of a receiving apparatus featuring a de-correlator, in accordance with an embodiment of the invention.

Referring now to FIG. 5, shown is a schematic of an example signal processor 500 of a receiving apparatus featuring a de-correlator 515, in accordance with an embodiment of the invention. The signal processor 500 might, for example, be implemented in a DSP. It is to be understood that the signal processor 500 is shown with very specific components in a very specific arrangement for illustrative purposes only. Other configurations are possible and are within the scope of the invention.

Blocks 501 through 514 of the signal processor 500 are similar to blocks 401 through 414 of the signal processor 400 shown in FIG. 4. Also, much like the signal processor 400 shown in FIG. 4, the signal processor 500 shown in FIG. 5 has an input 551, an output 552, and can provide feedback 553. However, the signal processor 500 shown in FIG. 5 differs from the signal processor shown in FIG. 4 in that a de-correlator 515 is included.

The de-correlator 515 operates to de-correlate the correlated noise for example by applying a de-correlation matrix. While the de-correlator 515 also causes the two recovered signals from the rotator 511 to be mixed, this mixing is performed in a controlled way. Correspondingly, the de-mapper 512 either decodes or calculates LLR for these mixed signals. In this regard, the de-mapper 512 of FIG. 5 is different from the de-mapper 412 of FIG. 4. There are many ways in which the de-correlator 515 may be implemented. An example is described below with reference to FIG. 6.

Figure 6:
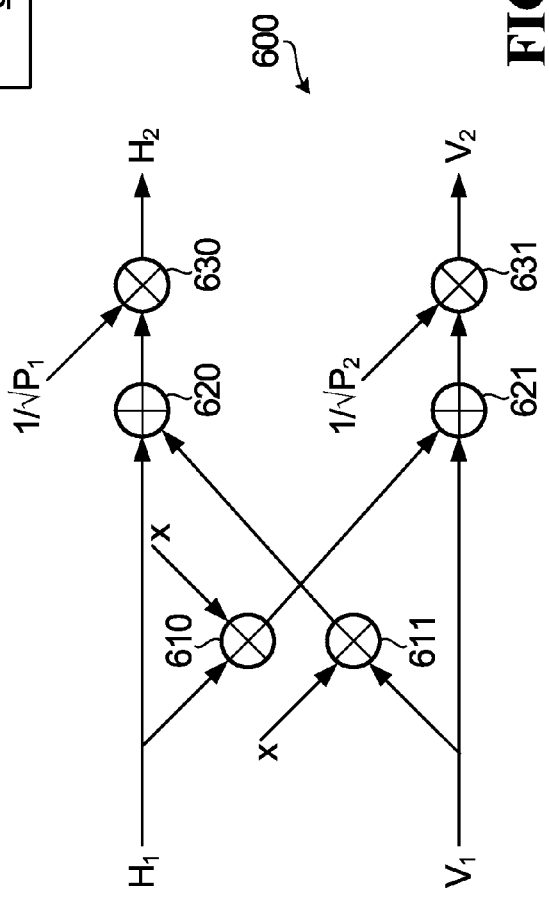
FIG. 6 is a schematic of an example de-correlator that may be implemented by the signal processor of FIG. 5.

Referring now to FIG. 6, shown is a schematic of an example de-correlator 600 that may be implemented by the receiving apparatus of FIG. 5. The de-correlator 600 has a first set of multipliers 610, 611, a set of adders 620, 621, and a second set of multipliers 630, 631. These components implement a de-correlation matrix with specific tap coefficients in this example, but other de-correlators with other tap coefficients are possible. The de-correlator 600 is a 2×2 single-tap finite impulse response (FIR) that is applied to the recovered signals $H_1$, $V_1$ at the output of the rotator 511. The de-correlator 600 generates new signals $H_2$, $V_2$ based on the recovered signals $H_1$, $V_1$ from the rotator 511 according to $$H_2 = \frac{1}{\sqrt{P_1}} H_1 + \frac{x}{\sqrt{P_1}} V_1, \text{ and} \quad [4]$$

$$V_2 = \frac{1}{\sqrt{P_2}} V_1 + \frac{x}{\sqrt{P_2}} H_1. \quad [5]$$

The coefficients are implementation-specific. By applying the decorrelation matrix to the recovered signals $H_1$, $V_1$ as shown, there will be a power gain $P_1$ to $H_2$ and a power gain $P_2$ to $V_2$. To normalize the power gain back to 1, $1/\sqrt{P_1}$ and $1/\sqrt{P_2}$ are applied to $H_2$ and $V_2$ respectively using the second set of multipliers 630, 631.

In specific implementations, x, $P_1$, and $P_2$ are defined as $$x = \frac{1 + \frac{1}{\alpha^2} - \sqrt{\left(1 + \frac{1}{\alpha^2} - \left(\frac{1}{\alpha^2} - 1\right)\sin 2\theta\right)\left(1 + \frac{1}{\alpha^2} + \left(\frac{1}{\alpha^2} - 1\right)\sin 2\theta\right)}}{\left(\frac{1}{\alpha^2} - 1\right)\sin 2\theta} \quad [6]$$

$$P_1 = \left(1 + \frac{x^2}{\alpha^2}\right)(\cos\theta)^2 + \left(x^2 + \frac{1}{\alpha^2}\right)(\sin\theta)^2 - x\left(\frac{1}{\alpha^2} - 1\right)\sin 2\theta, \text{ and} \quad [7]$$

$$P_2 = \left(x^2 + \frac{1}{\alpha^2}\right)(\cos\theta)^2 + \left(1 + \frac{x^2}{\alpha^2}\right)(\sin\theta)^2 - x\left(\frac{1}{\alpha^2} - 1\right)\sin 2\theta, \quad [8]$$

where $\alpha$ is a link attenuation ratio between two axes. These definitions result in very specific coefficients for equations [4] and [5]. However, it is to be understood that other coefficients are possible and are within the scope of the invention. Other coefficients that normalize the power gain may be used.

Methods for Transmitting and Receiving Polarized Signals

Figure 7:
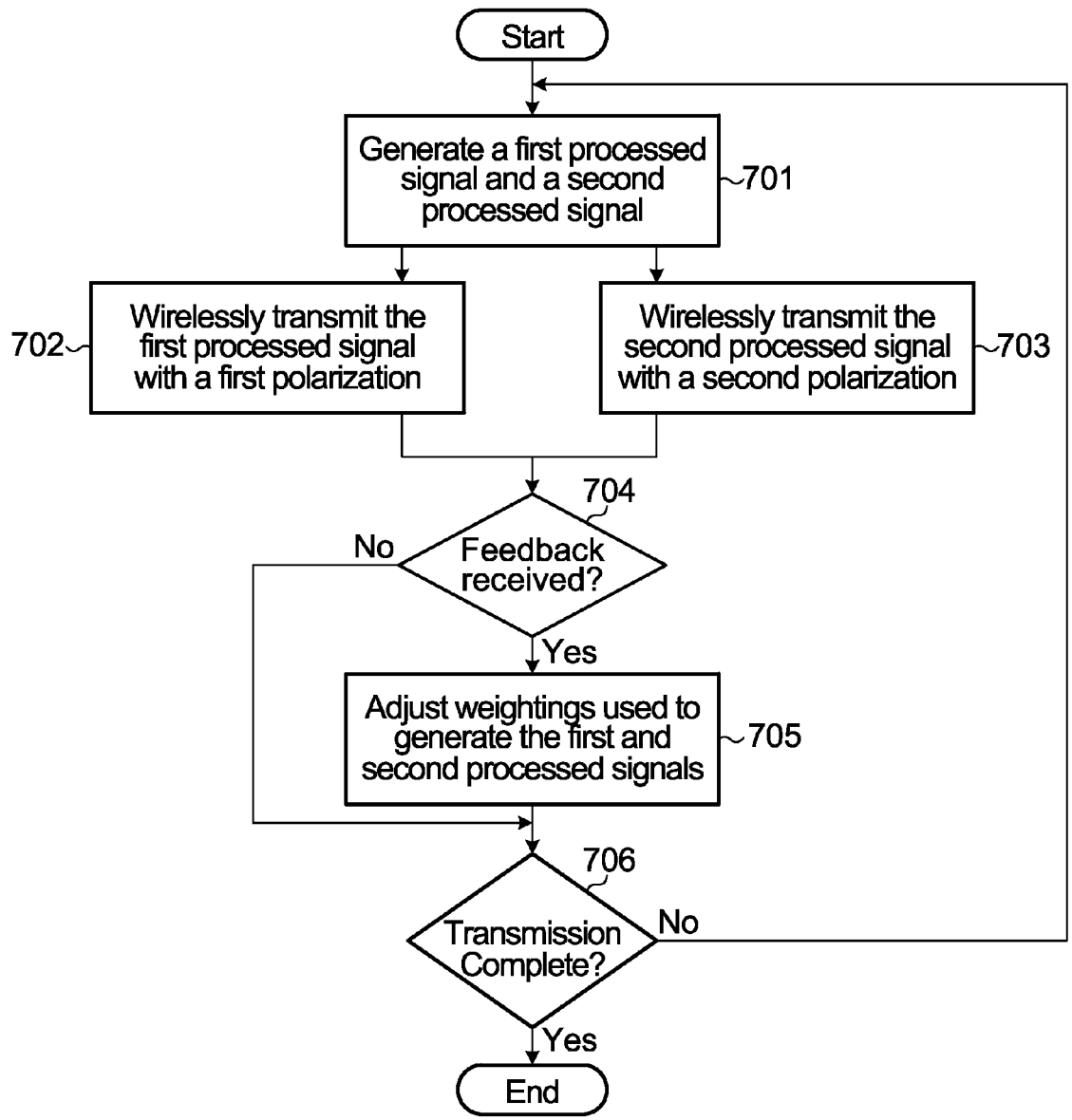
FIG. 7 is a flow chart of an example method for transmitting polarized signals, in accordance with an embodiment of the invention.

Referring now to FIG. 7, shown is a flow chart of an example method for transmitting polarized signals, in accordance with an embodiment of the invention. This method may be implemented by a transmitting apparatus, for example by the transmitting apparatus 110 shown in FIG. 1.

The method begins with the transmitting apparatus having first and second signals, which include data to be transmitted over an air link to a receiving apparatus. At step 701, the transmitting apparatus processes the first and second signals with a rotation matrix to generate a first processed signal and a second processed signal. According to this processing, each of the first and second processed signals is a respective different weighted combination of the first and second signals. Example details of how this rotation processing may be accomplished have been provided above and are not repeated here.

At step 702, the transmitting apparatus wirelessly transmits the first processed signal with a first polarization. At the same time, at step 703, the transmitting apparatus wirelessly transmits the second processed signal with a second polarization. Details of how the transmitting apparatus may transmit the polarized signals have been provided above and are not repeated here.

The first and second polarized signals have polarizations that are substantially orthogonal to one another. For example, the first and second polarized signals may be horizontally-polarized and vertically-polarized signals. However, other polarizations are possible as previously described.

In some implementations, as in the illustrated example, the rotation processing is performed based on feedback provided by a receiving apparatus. If at step 704 the transmitting apparatus receives feedback, then at step 705 the transmitting apparatus adjusts weightings used to generate the first and second processed signals in accordance with the feedback. Example details of the feedback and how the weightings may be adjusted based on the feedback have been provided above and are not repeated here.

Note that the feedback can be received and applied at any stage of the method. The specific order of the steps in the method is not essential. In alternative implementations, the rotation processing may be performed without any feedback as previously described.

If at step 706 the transmission is complete, then the method concludes. However, if at step 706 the transmission is not complete because there is more data to send, then the method loops back to step 701. Steps 701, 702 and 703 are repeated until the transmission is complete. Step 705 is repeated when and if feedback is received at step 704.

Figure 8:
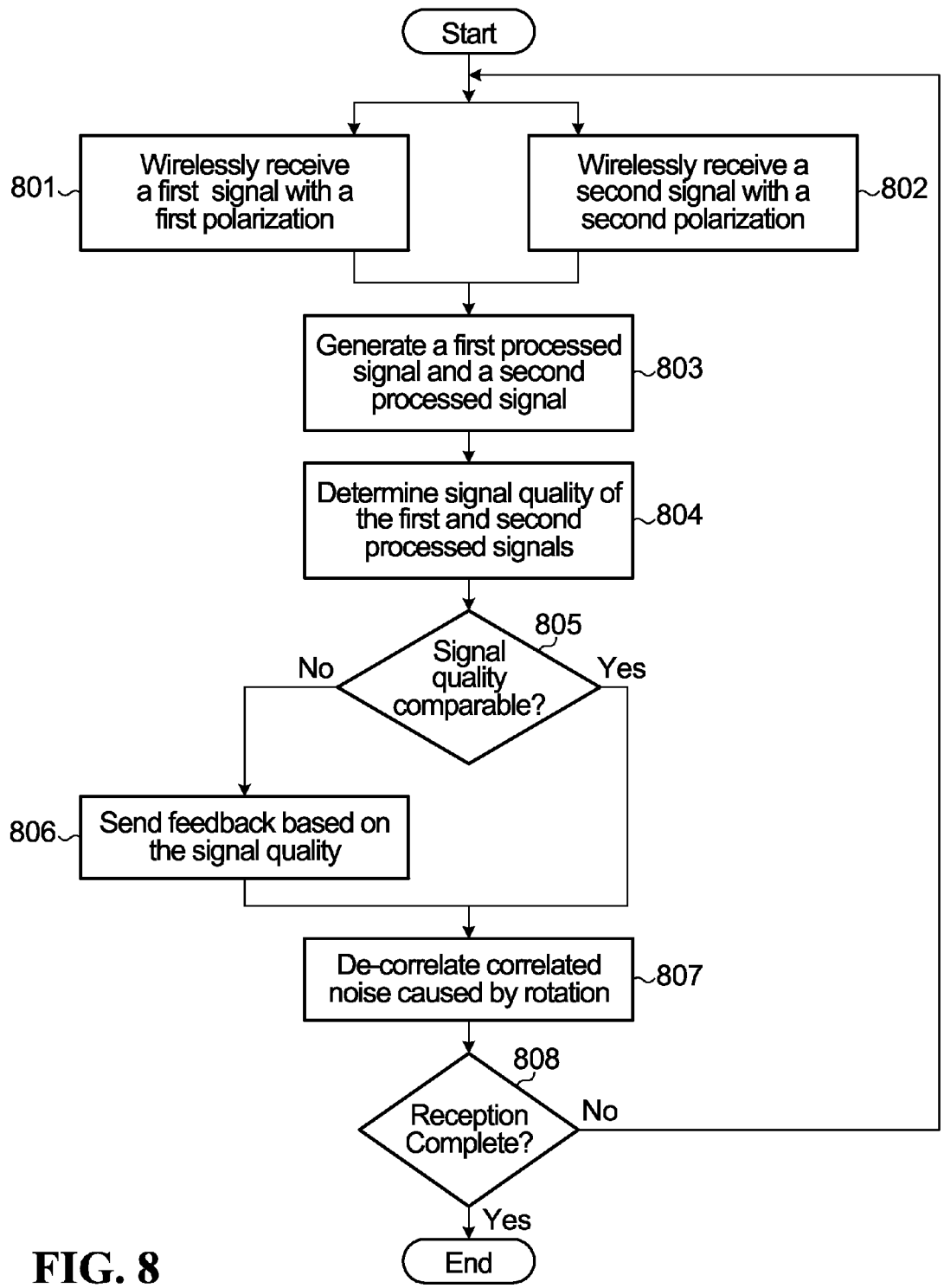
FIG. 8 is a flow chart of an example method for receiving polarized signals, in accordance with an embodiment of the invention.

Referring now to FIG. 8, shown is a flow chart of a method for receiving polarized signals, in accordance with an embodiment of the invention. This method may be implemented by a receiving apparatus, for example by the receiving apparatus 120 shown in FIG. 1.

At step 801 the receiving apparatus wirelessly receives a first signal with a first polarization. At the same time, at step 802, the receiving apparatus wirelessly receives a second signal with a second polarization.

The first and second polarized signals have polarizations that are substantially orthogonal to one another. For example, the first and second polarized signals may be horizontally-polarized and vertically-polarized signals. However, other polarizations are possible as previously described.

At step 803, the receiving apparatus processes the first and second signals with a rotation matrix to generate a first processed signal and a second processed signal. According to this processing, each of the first and second processed signals is a respective different weighted combination of the first and second signals. This rotation processing is complementary to the rotation processing performed by the transmitting apparatus. Example details of how this rotation processing may be accomplished have been provided above and are not repeated here.

In some implementations, as in the illustrated example, the receiving apparatus provides feedback to a transmitting apparatus based on signal quality of the first and second processed signals. In particular, at step 804, the receiving apparatus determines a first signal quality of the first processed signal and a second signal quality of the second processed signal. If at step 805 the receiving apparatus determines that the first and second processed signals do not have comparable signal quality, then feedback is provided at step 806 so that rotation processing performed by the transmitting apparatus can be adjusted. The goal is to achieve comparable signal quality for the first and second processed signals, as poor signal quality for one of the processed signals can limit overall throughput for the wireless communication as previously discussed. Example details of the feedback and how the weightings may be adjusted based on the feedback have been provided above and are not repeated here.

If at step 805 the receiving apparatus determines that the first and second processed signals have comparable signal quality, then no feedback is provided because the rotation processing performed by the transmitting apparatus is deemed to be suitable. In alternative implementations, feedback may be provided regardless of whether the first and second processed signals have comparable signal quality, even if the feedback is an indication that no changes are needed for the rotation processing performed by the transmitting apparatus.

Note that the feedback can be provided at any stage of the method. The specific order of the steps in the method is not essential. In alternative implementations, the receiving apparatus does not provide any feedback.

In some implementations, as in the illustrated example at step 807, the receiving apparatus performs noise de-correlation. Details of such de-correlation have been provided above and are not repeated here.

If at step 808 the reception is complete, then the method concludes. However, if at step 808 the transmission is not complete because there is more data to receive, then the method loops back to steps 801 and 802. Steps 801, 802, 803, 804, 805 and 807 are repeated until the transmission is complete. Step 806 is repeated when and if feedback is to be sent as determined by step 805.

Example Performance Results

Example performance results are described in this section. It is to be understood that these examples are very specific and are provided for illustrative purposes only.

Figure 9:
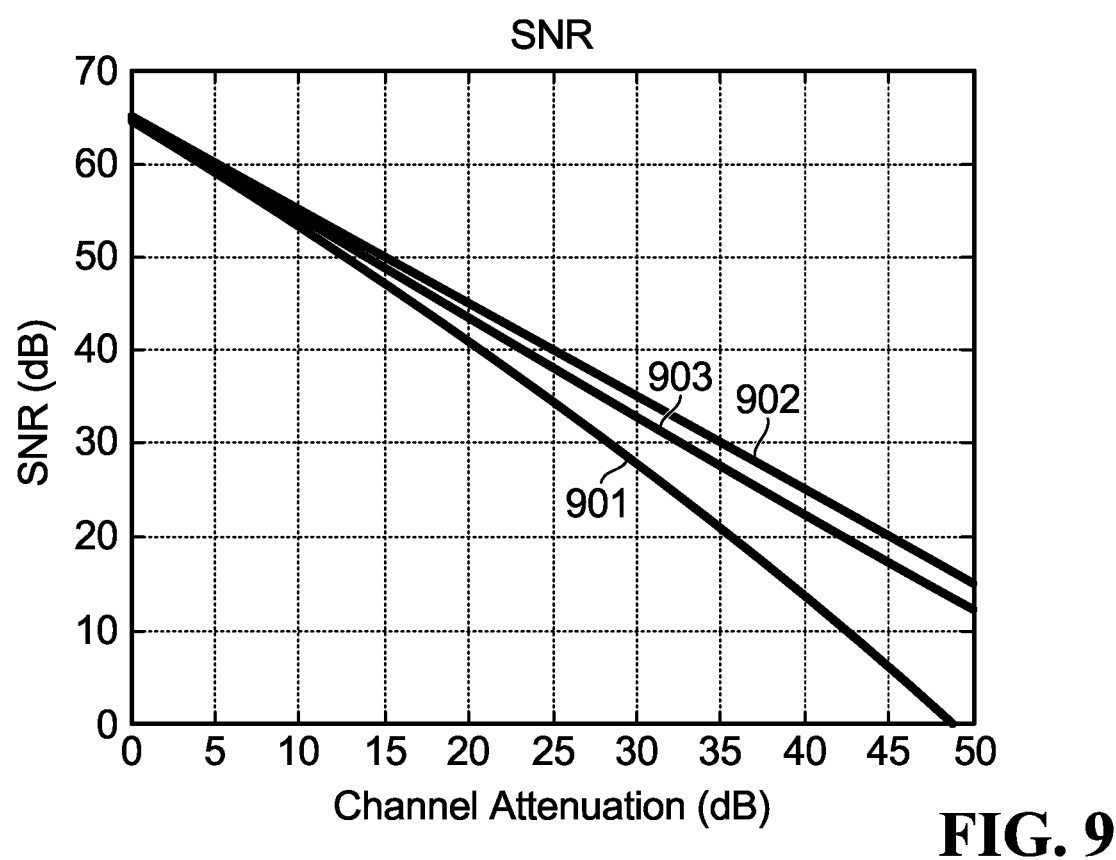
FIG. 9 is a graph depicting example Signal to Noise Ratio (SNR) versus channel attenuation caused by rain.

Referring now to FIG. 9, shown is a graph depicting example SNR versus channel attenuation caused by rain. The graph assumes a 65 dB link budget, which is an accounting of all gains and losses from a transmitter to a receiver. The graph shows SNR for a horizontally-polarized signal 901 and for a vertically-polarized signal 902 that have not undergone any rotation processing. Note that the horizontally-polarized signal 901 experiences relatively poor SNR compared to the vertically-polarized signal 902. The horizontally-polarized signal 901 is attenuated relative to the vertically-polarized signal because it is generally perpendicular to the direction of the rain. For instance, with a channel attenuation of 45 dB, SNR for the horizontally-polarized signal 901 and the vertically-polarized signal 902 are respectively at 6 dB and 20 dB.

The graph also shows a hypothetical SNR at 903 for the horizontally-polarized and vertically-polarized signals. If a channel attenuation of 45 dB was hypothetically applied evenly to the horizontally-polarized and vertically-polarized signals, then SNR for each polarization would be 18 dB in this example. However, the horizontally-polarized and vertically-polarized signals are not attenuated evenly by the air link. Note that SNR of the horizontally-polarized signal 901 is well below the average SNR. The relatively poor SNR of the horizontally-polarized signal 901 can limit overall throughput for wireless communication as previously described.

Although rotation processing does not avoid the attenuation of the horizontally-polarized signal 901 and the vertically-polarized signal 902 as shown in FIG. 9, the rotation processing may reduce the harmful effects of the attenuation. For example, any decrease of SNR of the signals that are recovered by a receiving apparatus due to a relatively high attenuation of the horizontally-polarized signal 901 may be shared by the recovered signals. More specifically, the combined throughput of two channels with the same SNR can be better than the throughput of two channels with differing SNR. Taking the example above, the combined throughput of two channels with an 18 dB SNR can be better than the combined throughput of a first channel with 20 dB SNR and a second channel with 6 dB SNR. As a specific example, a recovered signal may experience an increase of SNR by more than 6 dB during rain than if there was no rotation processing and the signal was instead transmitted as the horizontally-polarized signal. While FIG. 9 suggests that greater improvement is possible, actual improvement will vary and will depend on channel attenuation and link budget.

In the illustrated example, the attenuation caused by rain for the horizontally-polarized and vertically-polarized signals has been calculated according to ITU-R P.530-15[1]. In particular, the polarization attenuation is calculated as $$A_V = \frac{300 A_H}{355 + A_H}, \text{ or} \qquad [6]$$

$$A_H = \frac{335 A_V}{300 - A_V}, \qquad [7]$$

where $A_H$ and $A_V$ represent attenuation relationships for horizontally-polarized and vertically-polarized signals. By setting one value for $A_H$, the corresponding value for $A_V$ can be derived from equation [6] or equation [7].

[1] Recommendation ITU-R P.530-15, *Propagation data and prediction methods required for the design of terrestrial line-of-sight systems* (September 2013)

If the two recovered signals have comparable SNR, then the same modulation level may be used, which may improve spectral efficiency as previously described. Such gains in spectral efficiency may vary depending on link budget. Transmissions having a lower link budget may see greater gains in spectral efficiency. To illustrate this point, examples are provided below with reference to FIGS. 10A and 10B for a 65-decibel link budget and FIGS. 11A and 11B for a 50-decibel link budget.

Figure 10A:
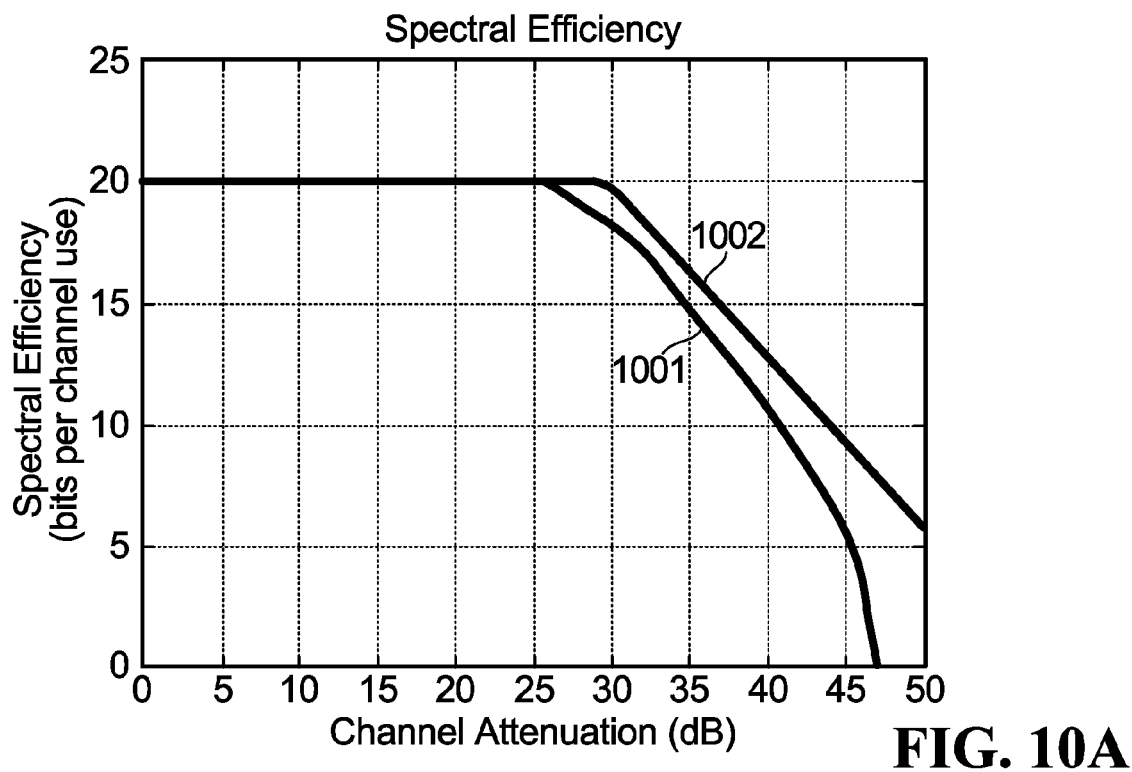
FIGS. 10A and 10B are graphs depicting spectral efficiency versus channel attenuation for a 65-decibel link budget.
Figure 10B:
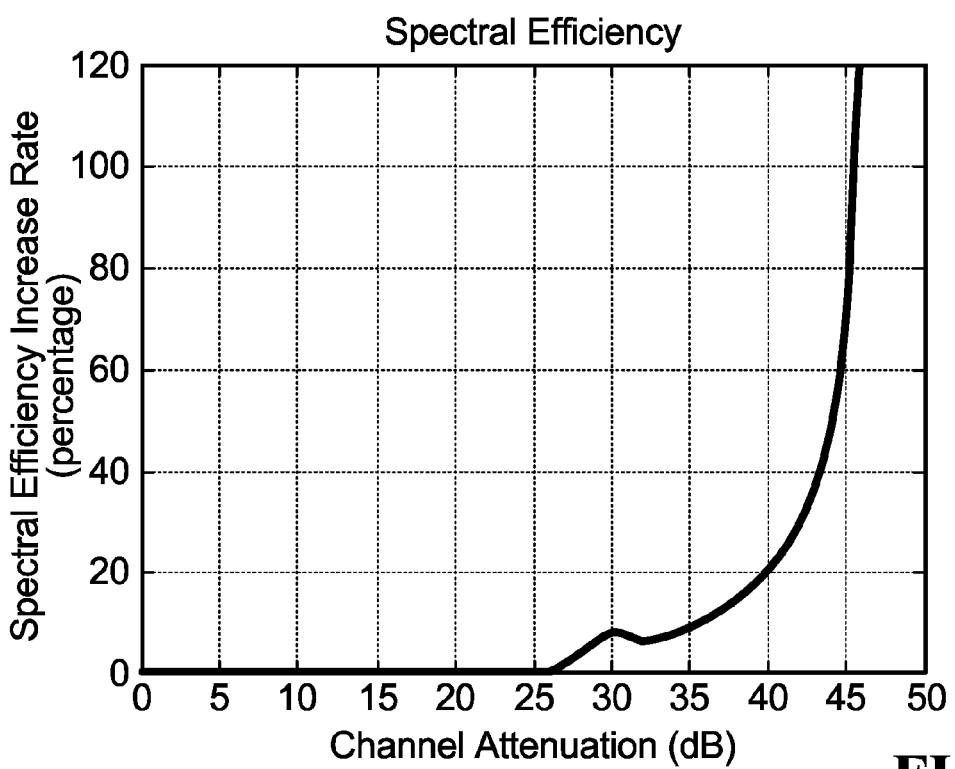

Referring first to FIGS. 10A and 10B, shown are graphs depicting spectral efficiency versus channel attenuation for a 65-decibel link budget. In FIG. 10A, spectral efficiency 1001 for signals that have not been subjected to rotation processing described earlier degrades with a channel attenuation of greater than about 26 dB. The spectral efficiency 1002 for signals that have been subjected to the rotation processing is enhanced. The SNR of the signals that have been subjected to the rotation processing may permit a higher modulation level compared to the signals that have not been subjected to rotation processing, thereby resulting in greater spectral efficiency. As shown in FIG. 10B, the relative increase in spectral efficiency grows significantly as channel attenuation increases. For instance, spectral efficiency may double when the channel attenuation is around 45 dB or 46 dB.

Figure 11A:
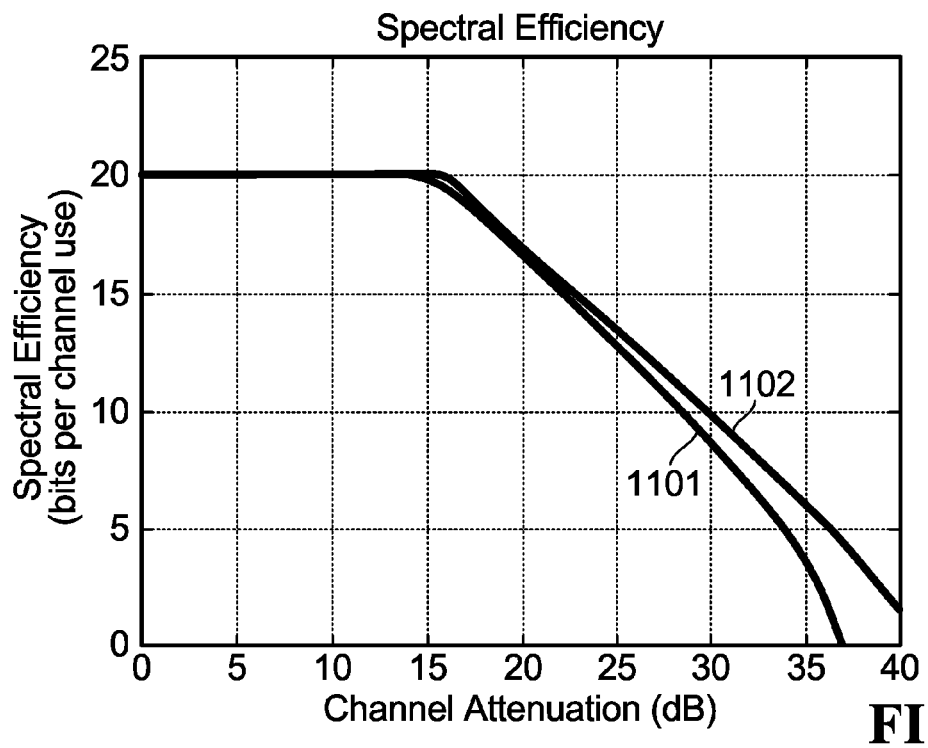
FIGS. 11A and 11B are graphs depicting spectral efficiency versus channel attenuation for a 50-decibel link budget.
Figure 11B:
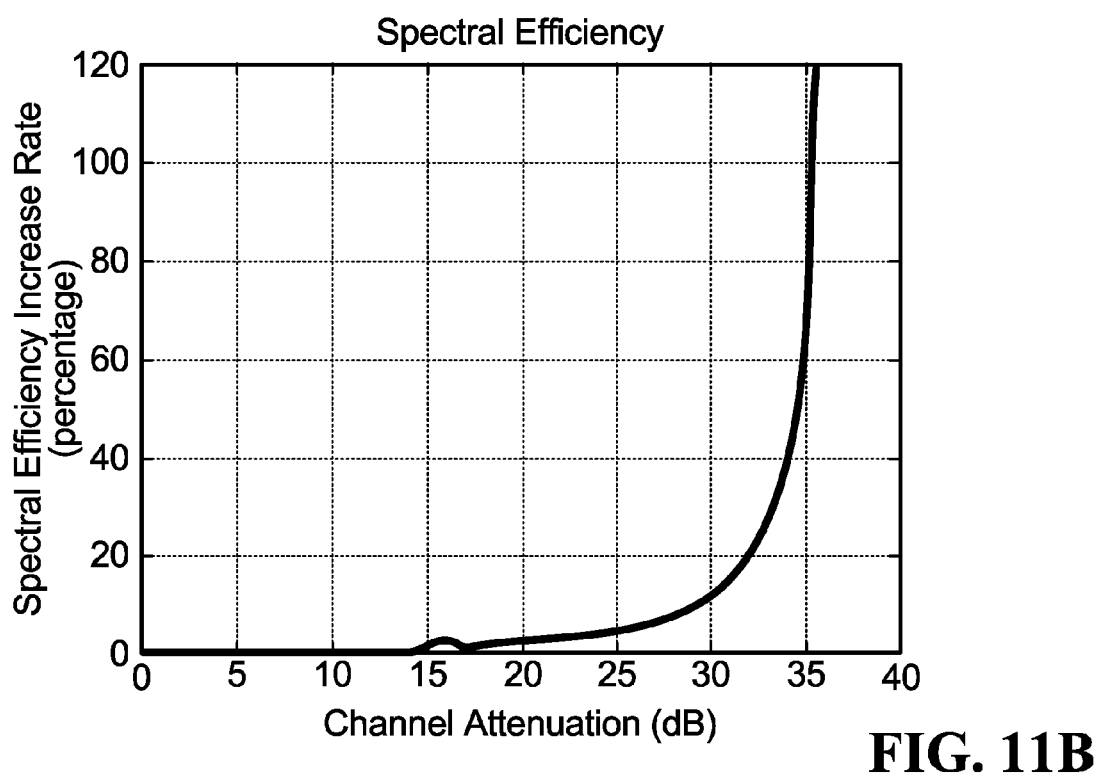

Referring now to FIGS. 11A and 11B, shown are graphs depicting spectral efficiency versus channel attenuation for a 50-decibel link budget. In FIG. 11A, spectral efficiency 1101 for signals that have not been subjected to rotation processing degrades with a channel attenuation of greater than about 14 dB. The spectral efficiency 1102 for signals that have been subjected to the rotation processing is enhanced in this example. The SNR of the signals that have been subjected to the rotation processing may permit a higher modulation level compared to the signals that have not been subjected to rotation processing, thereby resulting in greater spectral efficiency. As shown in FIG. 11B, the relative increase in spectral efficiency grows significantly as channel attenuation increases. For instance, spectral efficiency may double when the channel attenuation is around 35 dB or 36 dB.

In comparing FIGS. 11A and 11B against FIGS. 10A and 10B, it is apparent that gains in spectral efficiency may be large when the link budget is small. Indeed, when the link budget is small, SNR tends to be more vulnerable to channel attenuation. Thus, embodiments of the invention may help to enhance spectral efficiency in situations in which the link budget is relatively constrained and there is presence of channel attenuation due to precipitation.

Numerous modifications and variations of the present invention are possible in light of the above teachings. It is therefore to be understood that within the scope of the appended claims, the invention may be practised otherwise than as specifically described herein.

We claim:
1. An apparatus comprising:
a signal processor configured to process a first signal and a second signal with a rotation matrix to produce a first processed signal and a second processed signal such that each of the first and second processed signals is a respective different weighted combination of the first and second signals; and
a transmitter configured to wirelessly transmit the first processed signal with a first polarization, and to wirelessly transmit the second processed signal with a second polarization that is substantially orthogonal to the first polarization;
wherein the rotation matrix is a real matrix used to rotate the first signal and the second signal.

2. The apparatus of claim 1, wherein:
the signal processor is configured to, based on received feedback, adjust an angle of rotation of the rotation matrix.

3. A method comprising:
processing a first signal and a second signal with a rotation matrix to produce a first processed signal and a second processed signal such that each of the first and second processed signals is a respective different weighted combination of the first and second signals;
wirelessly transmitting the first processed signal with a first polarization; and
wirelessly transmitting the second processed signal with a second polarization that is substantially orthogonal to the first polarization;
wherein the rotation matrix is a real matrix used to rotate the first signal and the second signal.

4. The method of claim 3, wherein:
the rotation matrix comprises additional processing to produce the first processed signal and the second processed signal.

5. The method of claim 4, wherein the additional processing comprises a gain.

6. The method of claim 4, wherein:
the rotation and the additional processing are applied concurrently in a single operation.

7. The method of claim 3, further comprising:
based on received feedback, adjusting an angle of rotation of the rotation matrix.

8. The method of claim 7, wherein:
the received feedback comprises an indication of signal quality for signals recovered at a receiver from the first and second processed signals; and
the angle of rotation is adjusted based on the indication of signal quality.

9. The method of claim 7, wherein the received feedback comprises an indication of an updated value to use for the angle of rotation.

10. The method of claim 7, wherein the received feedback comprises an indication to increment the angle of rotation or an indication to de-increment the angle of rotation.

11. The method of claim 3, wherein the rotation matrix is $$\begin{bmatrix} \cos\theta & -\sin\theta \\ \sin\theta & \cos\theta \end{bmatrix}$$

with $\theta$ being an angle of rotation.

12. An apparatus comprising:
a receiver configured to wirelessly receive a first signal with a first polarization, and to wirelessly receive a second signal with a second polarization that is substantially orthogonal to the first polarization; and
a signal processor configured to process the first and second signals with a rotation matrix to produce a first processed signal and a second processed signal such that each of the first and second processed signals is a respective different weighted combination of the first and second signals;
wherein the rotation matrix is a real matrix used to rotate the first signal and the second signal.

13. The apparatus of claim 12, wherein:
the signal processor is configured to determine a first signal quality of the first processed signal and a second signal quality of the second processed signal; and
the apparatus further comprises a transmitter configured to transmit feedback based on the first and second signal quality.

14. A method comprising:
wirelessly receiving a first signal with a first polarization;
wirelessly receiving a second signal with a second polarization that is substantially orthogonal to the first polarization;
processing the first and second signals with a rotation matrix to produce a first processed signal and a second processed signal such that each of the first and second processed signals is a respective different weighted combination of the first and second signals;
wherein the rotation matrix is a real matrix used to rotate the first signal and the second signal.

15. The method of claim 14, wherein:
the rotation matrix comprises additional processing to produce the first processed signal and the second processed signal.

16. The method of claim 15, wherein the additional processing comprises a gain.

17. The method of claim 15, wherein:
the rotation and the additional processing are applied concurrently in a single operation.

18. The method of claim 14, further comprising:
determining a first signal quality of the first processed signal and a second signal quality of the second processed signal; and
transmitting feedback based on the first and second signal quality.

19. The method of claim 18, wherein transmitting the feedback based on the signal quality comprises:
transmitting the feedback in response to a determination that the first and second processed signals have different signal quality.

20. The method of claim 18, wherein the feedback comprises an indication of the signal quality for the first and second processed signals.

21. The method of claim 18, wherein the feedback comprises an indication of an updated value to use for an angle of rotation of the rotation matrix.

22. The method of claim 18, wherein the feedback comprises an indication to increment an angle of rotation of the rotation matrix or an indication to de-increment the angle of rotation.

23. The method of claim 14, wherein the rotation matrix is $$\begin{bmatrix} \cos\theta & \sin\theta \\ -\sin\theta & \cos\theta \end{bmatrix}$$

with $\theta$ being an angle of rotation.

24. The method of claim 14, further comprising:
applying a de-correlation matrix to the first and second signals.

25. The method of claim 3, wherein:
wirelessly transmitting the first processed signal with the first polarization comprises wirelessly transmitting the first processed signal with a horizontal polarization; and
wirelessly transmitting the second polarized signal with the second polarization comprises wirelessly transmitting the second processed signal with a vertical polarization.

26. The method of claim 14, wherein:
wirelessly receiving the first signal with the first polarization comprises wirelessly receiving the first signal with a horizontal polarization; and
wirelessly receiving the second signal with the second polarization comprises wirelessly receiving the second signal with a vertical polarization.

* * * * *